(12) United States Patent
Wang et al.

(10) Patent No.: US 10,285,098 B2
(45) Date of Patent: May 7, 2019

(54) METHOD AND NODE FOR REDUCING HANDOVER SIGNALING ASSOCIATED WITH GROUP HANDOVER

(71) Applicant: Telefonaktiebolaget L M Ericsson (publ), Stockholm (SE)

(72) Inventors: Min Wang, Lulea (SE); Stefan Wanstedt, Lulea (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 14/443,012

(22) PCT Filed: Nov. 20, 2012

(86) PCT No.: PCT/SE2012/051278
§ 371 (c)(1),
(2) Date: May 14, 2015

(87) PCT Pub. No.: WO2014/081354
PCT Pub. Date: May 30, 2014

(65) Prior Publication Data
US 2015/0304911 A1    Oct. 22, 2015

(51) Int. Cl.
*H04W 4/00* (2018.01)
*H04W 36/00* (2009.01)
(Continued)

(52) U.S. Cl.
CPC ....... *H04W 36/0088* (2013.01); *H04W 36/32* (2013.01); *H04W 36/00* (2013.01); *H04W 36/08* (2013.01)

(58) Field of Classification Search
CPC . H04W 36/0088; H04W 36/32; H04W 36/00; H04W 36/08
See application file for complete search history.

(56) References Cited

U.S. PATENT DOCUMENTS

| | | | |
|---|---|---|---|
| 6,490,452 B1 * | 12/2002 | Boscovic | H04W 36/30 455/436 |
| 2004/0058678 A1 * | 3/2004 | deTorbal | H04W 36/32 455/437 |

(Continued)

FOREIGN PATENT DOCUMENTS

| | | |
|---|---|---|
| CN | 101730158 A | 6/2010 |
| CN | 102413524 A | 4/2012 |

(Continued)

OTHER PUBLICATIONS

PCT International Search Report, dated Jun. 21, 2013, in connection with International Application No. PCT/SE2012/051278, all pages.

(Continued)

*Primary Examiner* — Abdelnabi O Musa
(74) *Attorney, Agent, or Firm* — Patent Portfolio Builders, PLLC

(57) ABSTRACT

The present invention relates to a method for supporting handover in a first radio network node of a wireless network. The first radio network node serves wireless devices of a serving cell. The method comprises grouping a plurality of wireless devices in the serving cell into a group, and selecting one of the plurality of wireless devices as a coordinating wireless device for the group. The method also comprises requesting a measurement report from the coordinating wireless device for the group, wherein the measurement report is to support a joint handover decision for the plurality of wireless devices of the group.

18 Claims, 7 Drawing Sheets

(51) Int. Cl.
   *H04W 36/32*     (2009.01)
   *H04W 36/08*     (2009.01)

(56)         References Cited

U.S. PATENT DOCUMENTS

| | | | | |
|---|---|---|---|---|
| 2008/0125125 A1* | 5/2008 | Choi | .............. | H04W 36/0083 |
| | | | | 455/436 |
| 2009/0181694 A1* | 7/2009 | Byun | .............. | H04W 36/22 |
| | | | | 455/453 |
| 2010/0144354 A1* | 6/2010 | Ho | .............. | H04W 36/0005 |
| | | | | 455/437 |
| 2010/0240371 A1* | 9/2010 | Cook | .............. | H04W 36/0083 |
| | | | | 455/436 |
| 2011/0111753 A1* | 5/2011 | Vainikka | .............. | H04W 36/32 |
| | | | | 455/425 |
| 2012/0003962 A1* | 1/2012 | Jeon | .............. | H04W 36/0083 |
| | | | | 455/411 |
| 2012/0302240 A1* | 11/2012 | Tamaki | .............. | H04W 36/0011 |
| | | | | 455/436 |
| 2013/0272132 A1* | 10/2013 | Heo | .............. | H04W 28/02 |
| | | | | 370/236.2 |
| 2014/0073330 A1* | 3/2014 | Pan | .............. | H04W 36/0055 |
| | | | | 455/441 |
| 2015/0245255 A1* | 8/2015 | Van Phan | .............. | H04W 36/0016 |
| | | | | 455/457 |

FOREIGN PATENT DOCUMENTS

| | | |
|---|---|---|
| EP | 2 190 241 A1 | 5/2010 |
| WO | 20081044283 A1 | 4/2008 |
| WO | 20091155992 A1 | 12/2009 |

OTHER PUBLICATIONS

Chinese Office Action dated Dec. 26, 2017 in connection with Chinese Application No. 201280078152.2, 6 pages.
Chinese Search Report dated Dec. 26, 2017 in connection with Chinese Application No. 201280078152.2, 2 pages.
English language translation of Chinese Office Action and Search report dated Dec. 26, 2017 in connection with Chinese Application No. 201280078152.2, 6 pages.
Communication pursuant to Article 94(3) EPC dated Jun. 12, 2018 in connection with European Patent Appliction No. 12 799 658.5, 6 pages.

* cited by examiner

METHOD AND NODE FOR REDUCING HANDOVER SIGNALING ASSOCIATED WITH GROUP HANDOVER

TECHNICAL FIELD

The disclosure relates to a radio network node and to a method for supporting handover in a radio network node of a wireless network.

BACKGROUND

3GPP Long Term Evolution (LTE) is the fourth-generation mobile communication technologies standard developed within the 3rd Generation Partnership Project (3GPP) to improve the Universal Mobile Telecommunication System (UMTS) standard to cope with future requirements in terms of improved services such as higher data rates, improved efficiency, and lowered costs. The Universal Terrestrial Radio Access Network (UTRAN) is the radio access network of a UMTS and Evolved UTRAN (E-UTRAN) is the radio access network of an LTE system. A wireless device such as a User Equipment (UE) is wirelessly connected to a Radio Base Station (RBS) commonly referred to as an evolved NodeB (eNodeB) in an E-UTRAN and as a NodeB in UTRAN. An RBS is a general term for a radio network node capable of transmitting radio signals to the UE and receiving signals transmitted by the UE. The eNodeB is a logical node in LTE and the RBS is a typical example of a physical implementation of an eNodeB.

FIG. 1 illustrates a conventional radio access network in an LTE system. An eNodeB 101a with an antenna or transmission point 102a serves a UE 103 located within the eNodeB's geographical area of service also called a cell 105a. The eNodeB 101a is directly connected to a core network (not illustrated). The eNodeB 101a is also connected via an X2 interface to a neighboring eNodeB 101b with a transmission point 102b serving another cell 105b. In an UTRAN, a Radio Network Controller (RNC) is connected to and controls a nodeB, and is, among other things, in charge of management of radio resources in cells for which the RNC is responsible. In UTRAN, the RNC is connected to the core network.

High Speed Packet Access (HSPA) is a mobile communication protocol that has been developed to cope with higher data rates in UTRAN. In the current HSPA standardization work, signaling load and overhead reduction is an important area. Furthermore, there is also standardization work ongoing for LTE on how to further improve Handover (HO) performance, where reduced signaling overhead is one important part.

High signaling load might be due to either frequent Radio Resource Control (RRC) state changes, or frequent HO signaling messages. An example of RRC state changes is when the UE switches between two different RRC states, such as between RRC_IDLE and RRC_CONNECTED states. A typical signaling or message exchange for the RRC state change in UTRAN is shown in the signaling diagram of FIG. 2, illustrating the signaling between the UE 20 and the RNC 25.

The signaling is typically initiated by a measurement report 201 transmitted by the UE 20 to the RNC 25, which comprises the status information of the UE side. The measurement report 201 is followed by a command message such as the RRC Reconfiguration message 202 from the network side, which comprises the setup information that is required to change the UE state. After the state change, the UE 20 will respond with a confirm message such as the Reconfiguration Confirm message 203. Unnecessarily frequent RRC state events may be avoided with well-tuned settings.

A typical HO signaling procedure in E-UTRAN is shown in the signaling diagram of FIG. 3, illustrating the signaling between the UE 30, a serving eNodeB 35, and a target eNodeB 37. First, the serving eNodeB 35 will send an RRC reconfiguration message 301 to the UE 30 in its cell, comprising measurement configuration information such as what neighbour cells to measure and HO parameter values defining when to trigger a HO. The actual HO procedure is initiated by a Measurement report message 302, which is transmitted from the UE 30 to the serving eNodeB 35 on the network side. The Measurement report message 302 is triggered based on measurement events which are performed periodically by the UE 30 in accordance with the RRC reconfiguration message 301. To limit the reporting frequency, HO parameters such as a hysteresis threshold and a time to trigger will be used. The Measurement report message 302 comprises a measurement list with radio channel quality measurements for a number of neighboring cells which are potential target cells. The serving eNodeB 35 makes a HO decision, i.e., selects a target cell for the HO among the potential target cells upon reception of the Measurement report message 302. When the serving eNodeB 35 has selected the target cell, it will via the X2 interface communicate with the target eNodeB 37 controlling the selected target cell. The serving eNodeB 35 sends a HO request 303 to the target eNodeB 37. If the target cell is suitable for receiving the UE after the HO, the serving eNodeB 35 will receive a HO request ACK message 304 from the target eNodeB 37, and will then transmit a HO command message 305 to the UE 30. Upon the reception of the HO command message 305, the UE 30 will access the target cell by the RACH channel by sending a RACH access message 306 to the target eNodeB 37. If the access is successful a RACH access ACK message 307 is returned to the UE 30 together with a resource allocation for the access. Finally, the UE 30 will send a HO confirm message 308 to the target eNodeB 37.

As illustrated in FIG. 3, a HO procedure is composed of a sequence of RRC signaling messages. Some of the messages are big in size, such as the Measurement report message 302 and the HO command message 305, which thus contribute more to the signaling load than other messages. Frequent HO signaling exchange may be difficult to avoid. Well balanced HO event triggering settings may decrease the numbers of HO events. However, minimizing HO signaling may negatively impact the user performance if it results in that the HO is initiated too late.

When the signaling load is high, network nodes such as the RNC in UTRAN or the eNodeB in E-UTRAN are highly loaded by the processing of the RRC signaling. Furthermore, RRC signaling transfer will typically be transmitted with absolute priority over other data traffic. Hence, a high signaling overhead consumes radio access network resources, which means that fewer resources are left for data traffic processing. The consequence of high signaling load is an increased possibility of dropped connections due to a long connection setup delay, and thus a degraded user perceived performance.

SUMMARY

It is therefore an object to address some of the problems outlined above, and to minimize signaling overhead at HO.

This object and others are achieved by the method and the radio network node according to the independent claims, and by the embodiments according to the dependent claims.

In accordance with a first aspect of embodiments, a method for supporting HO in a first radio network node of a wireless network is provided. The first radio network node serves wireless devices of a serving cell. The method comprises grouping a plurality of wireless devices in the serving cell into a group, and selecting one of the plurality of wireless devices as the coordinating wireless device for the group.

The method also comprises requesting a measurement report from the coordinating wireless device. The measurement report is to support a joint HO decision for the plurality of wireless devices of the group.

In accordance with a second aspect of embodiments, a first radio network node of a wireless network configured to serve wireless devices of a serving cell and to support HO of the wireless devices is provided. The first radio network node comprises a processing circuit configured to group a plurality of wireless devices in the serving cell into a group, and to select one of the plurality of wireless devices as the coordinating wireless device for the group. The processing circuit is also configured to request a measurement report from the coordinating wireless device for the group. The measurement report is to support a joint HO decision for the plurality of wireless devices of the group.

An advantage of embodiments is that HO signaling overhead is reduced. This will in turn guarantee a robust connection setup and a good service performance.

Other objects, advantages and features of embodiments will be explained in the following detailed description when considered in conjunction with the accompanying drawings and claims.

DETAILED DESCRIPTION

In the following, different aspects will be described in more detail with references to certain embodiments of the invention and to accompanying drawings. For purposes of explanation and not limitation, specific details are set forth, such as particular scenarios and techniques, in order to provide a thorough understanding of the different embodiments. However, other embodiments that depart from these specific details may also exist.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while embodiments of the invention are primarily described in the form of a method and a node, they may also be embodied in a computer program product as well as in a system comprising a computer processor and a memory coupled to the processor, wherein the memory is encoded with one or more programs that may perform the functions disclosed herein.

Embodiments are hereinafter described in a non-limiting general context in relation to an example scenario in E-UTRAN, where the radio network node handling the HO is the eNodeB. However, it should be noted that the embodiments may be applied to any radio access network technology supporting HO based on measurement reports. In the case of UTRAN, the HO is managed by the RNC. The wireless device may be any kind of wireless terminal such as a UE, a portable computer, or a smartphone. Hereinafter the wireless device will be exemplified by a UE. It should be noted that the idea of grouping UEs to reduce signaling overhead may be applied for other radio resource management schemes. One example is group based scheduling where only one UE in a group of UEs is required to report a CQI to save control channel overhead.

Conventionally, HO signaling messages are dedicated for a specific UE. In other words, every UE has to transmit and receive all the messages in the HO procedure when performing a HO. The same procedure will be repeated for every UE performing a HO no matter where the UE is located. In a cell, there may be several UEs that are physically close to each other. Such closely located UEs may have similar radio channel quality and mobility intentions and/or patterns, which means that such UEs have a high probability to have similar neighboring cells and measurement reports, and thus the same target cell for HOs. There may therefore be situations when several closely related UEs take the same HO decisions, i.e., they perform a HO to a same target cell at approximately the same time.

Figure 1:
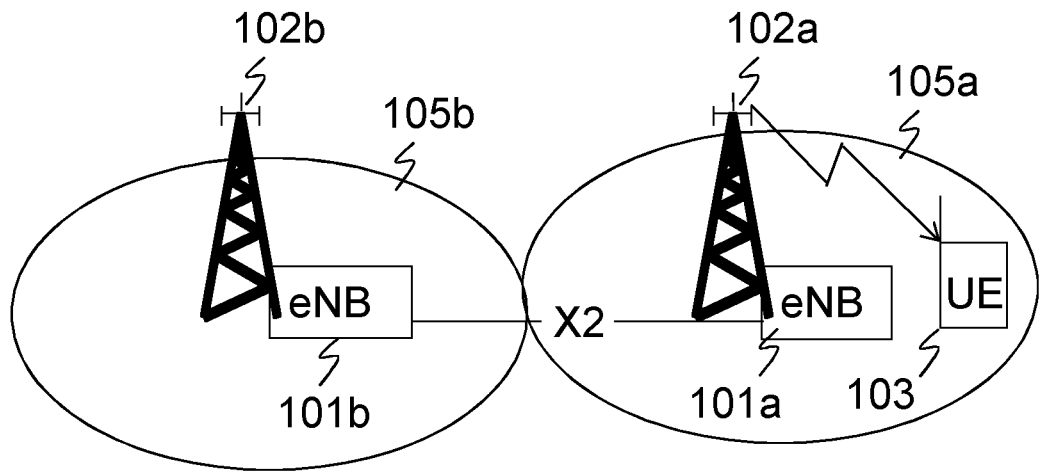
FIG. 1 is a schematic illustration of a radio access network in LTE.
Figure 2:
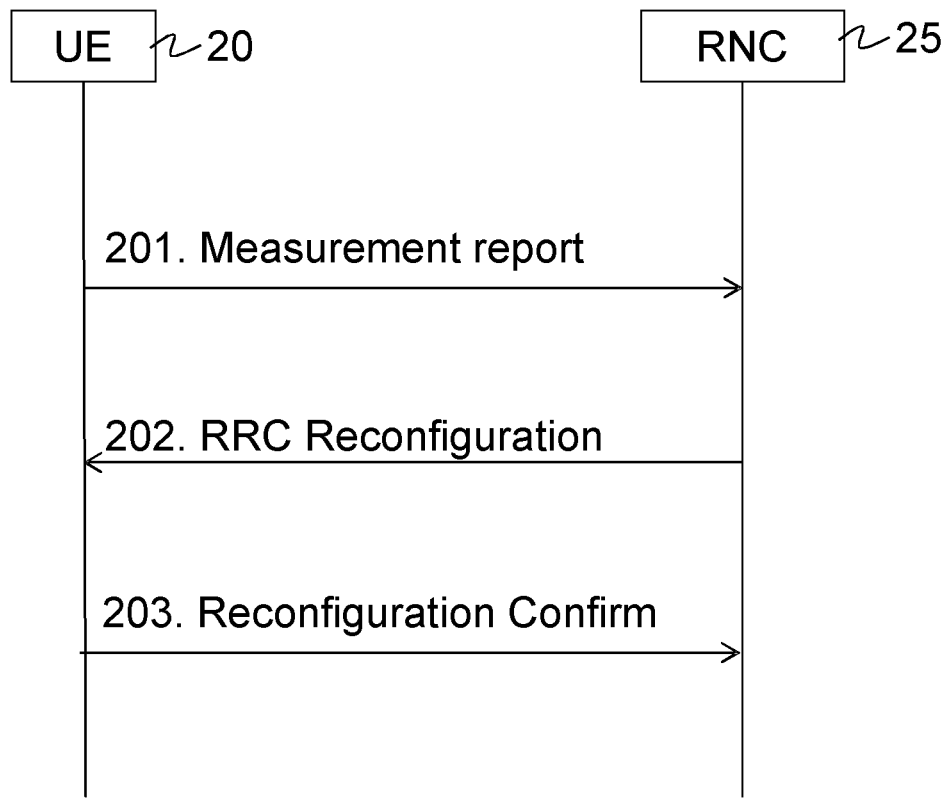
FIG. 2 is a signaling diagram schematically illustrating a typical signaling procedure for RRC state changes in UTRAN.
Figure 3:
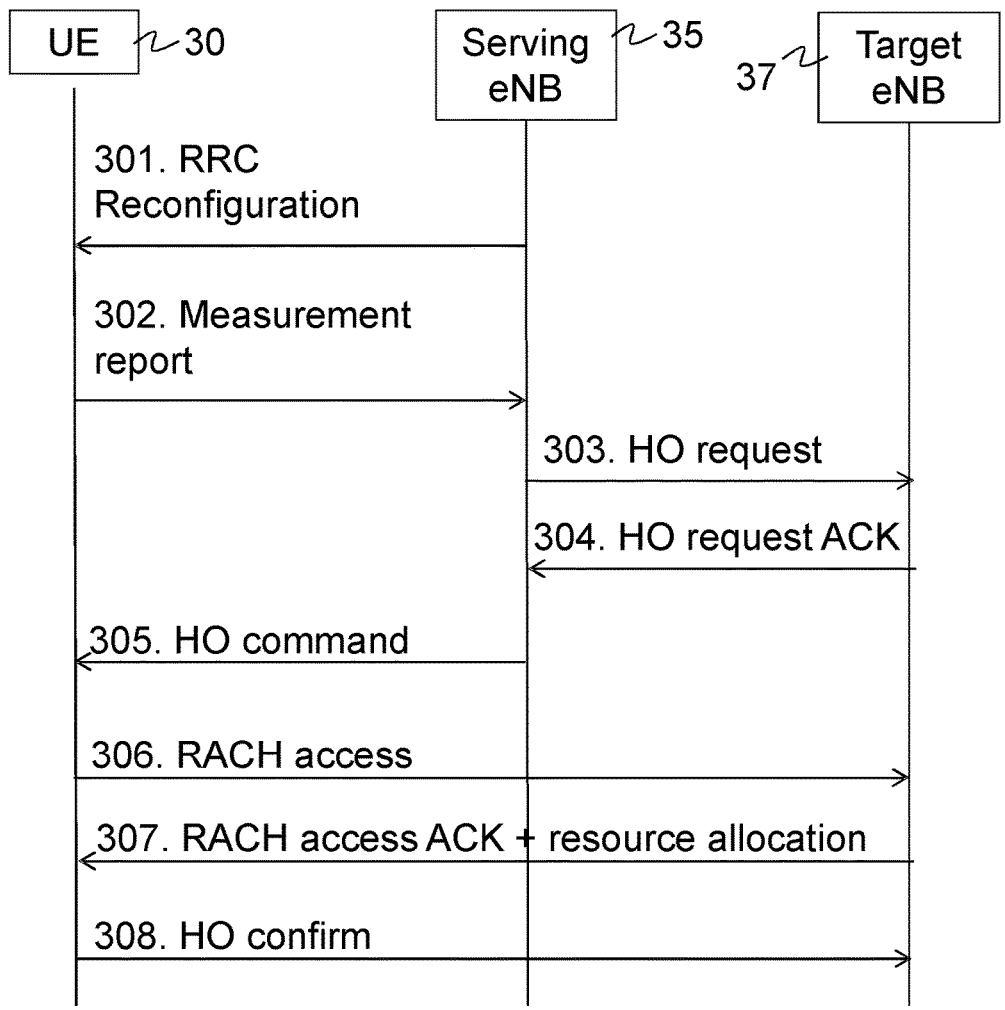
FIG. 3 is a signaling diagram schematically illustrating a HO procedure in E-UTRAN.

The problem of large signaling overhead at HOs is addressed by a solution where UEs in a serving cell of an RBS are grouped into one or more groups, and where one of the UEs in each group is selected to be a coordinating UE for the group. In this way a measurement report may be requested, e.g. in the form of the RRC reconfiguration message 301 as described above in the signaling diagram of FIG. 3, only from the coordinating UE instead of from all UEs of the groups. This may reduce the signaling overhead at HO drastically, especially as it is only the coordinating UE in a group of UEs that will be sending the large sized measurement reports. If there are N UEs in a group, 3*(N−1) messages may be saved for each HO.

Accordingly, in embodiments of the invention, a HO procedure may be initiated for a whole group instead of for each UE of the group. The HO will be initiated by a single HO measurement report reported by the coordinating UE in the group. The serving eNodeB can make a HO decision for the group, i.e., select the same target cell for the whole group. The selected target cell may then be prepared for the group via the exchange of X2 HO signaling messages. After the target cell preparation, dedicated preambles are reserved for all the UEs in the group.

Creation of the UE Group

Figure 4:
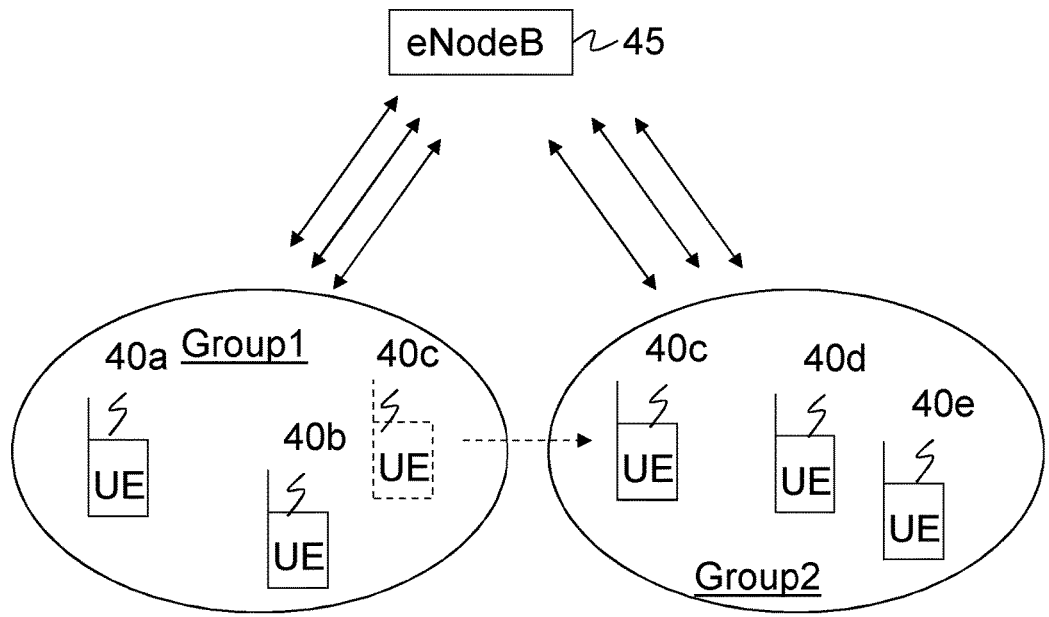
FIG. 4 is a block diagram schematically illustrating grouping of UEs according to embodiments of the invention.

The purpose of creating a group of UEs is to be able to use a common or joint HO procedure for UEs in a group. It is required that the UEs in the group are close to each other and that they belong to or are served by the same serving cell. In FIG. 4, the UE groups, Group1 and Group2, are maintained by the eNodeB 45.

A group may be created e.g. if there are two or more UEs, 40a-c, which are close to each other and have the same mobility behaviors, such as a similar moving direction and speed. A UE group, Group2, may be updated when a new UE or a UE, 40c, from another group, Group1, moves close to the rest of the UEs, 40d-e, in Group2, as illustrated by the dashed arrow in FIG. 4. Furthermore, a UE shall be removed from the group if the UE suddenly moves away from the rest of the group. An efficient group management is possible to implement based on a periodic check of the groups. The area in which UEs of a group are located, will typically be smaller than that of the cell. Hence, a cell could comprise several UE groups.

To avoid a signaling exchange between the UEs and the eNodeB, it is not required that the UEs of a group have information related to the group. It is only the eNodeB that needs to know about the group in order to make HO decisions.

When a serving eNodeB makes a joint HO decision for a group of UEs, the serving eNodeB prepares the same target cell for those UEs. After the preparation of the target cell, the serving eNodeB sends a HO command to each UE and triggers a HO separately for each UE. A UE that performs a HO upon the reception of a HO command may thus be a UE that has not sent any measurement report.

Several embodiments regarding how to do the grouping of UEs are discussed in sections A-D below.

A. Group Creation Based on Positioning

In embodiment A, UEs that are located physically close to each other will be grouped together based on positioning information for the UEs. Different UE positioning techniques may be used to obtain the positioning information. Some examples of standard positioning methods supported for E-UTRAN are:

Global Navigation Satellites Systems (GNSS) methods;
Time Difference of Arrival (TDOA) based methods;
Cell ID (CID) based methods;
Hybrid positioning methods using multiple methods from the previous bullets.

There could be more detailed positioning methods classified as network assisted or UE assisted. Based on positioning information for a UE, e.g. received from the UE itself, or determined by the network based on measurements performed by the UE, a distance to the eNodeB may be determined. However, the distance from UE to eNodeB is not always enough to determine if UEs are close to each other. Other information like orientation or angle from UE to eNodeB may need to be considered. Such additional information may be estimated or calculated based on e.g. positioning measurements. One alternative to calculate the angle is to calculate an Angle of Arrival (AoA) for radio signaling transmitted from the UE. Another alternative is to calculate the angle based on the UE position and the eNodeB position. For example, if it is assumed that the UE position is (X1, Y1), and the eNodeB position is (X2,Y2), the angle in the range from 0 to 360 degree can be calculated using the formula $arctg(dy/dx)$, where $dy=Y2-Y1$, and $dx=X2-X1$.

In order to group the UEs in the cell, the distances to the eNodeB for the different UEs may be divided into n levels, e.g., D1, D2, . . . Dn. The angle from UE to eNodeB can similarly be divided into k levels, A1, A2, . . . Ak. The UEs that are at a distance from the eNodeB which is within a range $Dn \pm \alpha$, and that have an angle to the eNodeB which is within the range $Ak \pm \beta$, belong to group G(n,k), where $\alpha$ and $\beta$ are offsets defined based on system dimensioning. The offset together with the different distance or angle levels determine a range with a minimum and a maximum value for each group. UEs that are within the range of a group thus belong to the group.

The eNodeB can check the status of groups periodically. In case a UE moves out of the range $Dn \pm \alpha$ and $Ak \pm \beta$, the UE is removed from the group G(n,k), and is possibly reassigned to another group by repeating the above described procedure.

B. Group Creation Based on Radio Channel Quality

In one embodiment, UEs are grouped together based on radio channel quality measurements received from the UEs. Some examples of radio channel quality measurements are downlink channel quality measurements, such as Reference Signal Received Power (RSRP) measurements, Reference Signal Received Quality (RSRQ) measurements, or Channel Quality Indicator (CQI) measurements. However, uplink radio channel quality measurements may also be used. The grouping based on radio channel quality may also be combined with grouping based on UE positions, as well as grouping based on angle information.

In analogy with the solution for grouping UEs based on positioning, the radio channel quality of the different UEs may be divided into m levels, e.g., Th1, Th2, . . . Thm. The number of levels, m, is dependent on how many UE groups the eNodeB or network would like to establish. The UEs that have a radio channel quality within a range $Thm \pm \chi$ belong to a same group. $\chi$ is an offset which may be defined based on system dimensioning. Information from channel quality measurement may be insufficient to setup a group since the UEs with similar channel quality might be located in different areas. Hence, radio channel quality measurements could be combined with other positioning alternatives to create a group.

C. Using UE Speed to Create Group

As already described above, the grouping of UEs may also depend on the UE moving speed and direction. UEs with similar moving direction and speed may then be grouped together, while leaving UEs moving in an opposite direction or not moving at all out of the group. Using the speed and the moving direction to decide how to group UEs is preferably combined with using UE positions or radio channel quality as the basis for the groups, as described in grouping procedure A and B above.

For a group of stationary UEs or slowly moving UEs, each UE stays in the group for quite a long time and the group is not so dynamically changed. For fast moving UEs, such as UEs in a moving vehicle, it is important to consider UE speed and also moving direction when grouping the UEs. Furthermore, for UEs on e.g. a bus or a train, it is likely that the HO for all the UEs in the vehicle occurs at the same location and to the same cell. Therefore, it is natural to include those UEs in the same group.

D. Device to Device Based Grouping

The grouping may in an another exemplary embodiment be done using device-to-device (D2D) neighbor discovery or detection, possibly in combination with the above described grouping embodiments A-C. One of the fundamental characteristics of D2D communication is that devices can discover nearby 25 devices. This can be done in different ways, either only by the devices themselves, without extra positioning information and/or with varying amounts of support from positioning information and network support. UEs, using such D2D discovery functionality, could therefore in one embodiment form a group by themselves. Using D2D discovery without NW assistance based on technologies such as WiFi and Bluetooth that operate on an unlicensed spectrum, means that the signaling involved in creating the groups does not cause interference in the spectrum used for communication between the UEs and the eNodeB. In one example embodiment, the following procedure for forming a group is used:

1) A UE identifies other UEs that with a certain probability belong to its group. The decision to form a group could be initiated by a UE, since many UEs already "look for" other UEs that broadcast a certain signal. However, an alternative is to let the eNodeB initiate the forming of UE groups, e.g. when system load is high and there are many UEs at the cell borders. The eNodeB may e.g. identify a UE suitable for forming a group based on characteristics such as available RATs, or position. This UE will thus be the coordinating UE. The coordinating UE broadcasts its intention to form a group to other UEs over e.g. Wifi and/or Bluetooth and/or some other radio technology, and may thereby form its own group.

2) Furthermore, additional information may be used with the UE proximity discovery based on D2D communication to form a group. Examples of such additional information are angle and distance information or UE speed, as described above in embodiments A-C.

The procedure according to steps 1) and 2) above needs to be repeated often enough to keep the group homogeneous with respect to UE position and speed and direction of movement.

Transmission of Measurement Report for a Group

Figure 5:
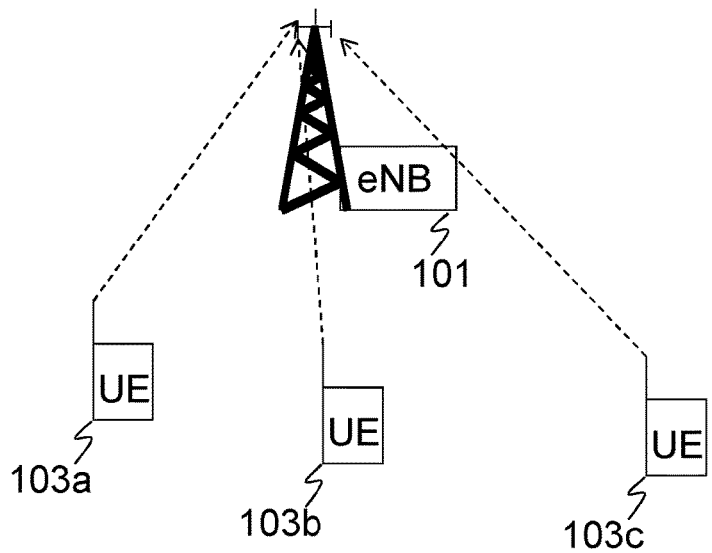
FIG. 5 is a block diagram schematically illustrating a selection of a coordinating UE of a group according to embodiments of the invention.

As already described above a coordinating UE is selected for a UE group. In one embodiment, the UE with the best radio channel quality in the group is selected as the coordinating UE. As an example, the UE with the best CQI is selected, or the UE with the lowest uplink path loss. FIG. 5 illustrates one example embodiment, where the eNodeB 101 receives CQI measurements from three UEs 103a-c, and selects one of the UEs 103a as the coordinating UE since it has reported the highest CQI measurement among the three UEs 103a-c. This also means that the coordinating UE for this group may change if the radio channel quality of the UEs change.

The selected coordinating UE represents the group of UEs, and performs the measurements of the neighboring cells based on the ordinary hysteresis and time to trigger thresholds. The other UEs in the group may therefore measure the neighboring cells with considerably longer cycles, or may even stop the measurements of neighboring cells until they get a measurement command from the serving eNodeB. Therefore, UEs other than the coordinating UE in a group could be configured with a longer Discontinuous Reception (DRX) cycle since they do not need perform the HO measurements of neighboring cells which typically require a more frequent monitoring of the downlink channel. The advantage of longer DRX cycles is a UE battery saving.

Figure 6A:
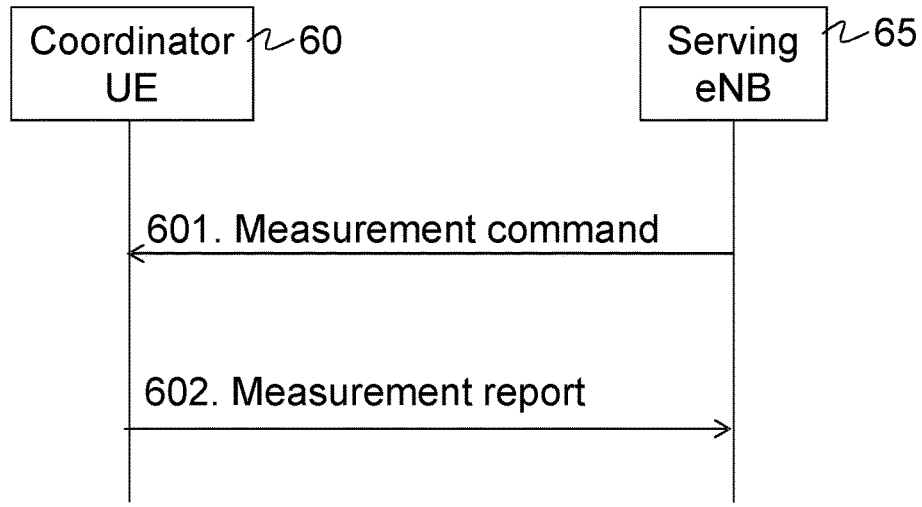
FIGS. 6a-b are signaling diagrams schematically illustrating signaling according to embodiments of the invention.

As illustrated in FIG. 6a, the coordinating UE 60 performs the HO measurements and sends measurement reports 602 to the serving eNodeB 65 upon reception of a measurement command 601. However, the rest of the UEs in the group will not receive any measurement command and will therefore not perform measurements of neighboring cells specified by the hysteresis and TTT. As a group of UEs may have different coordinating UEs over time, e.g. because the coordinating UE leaves the group, or because the radio channel quality of the coordinating UE becomes lower, the network may send another measurement command to a coordinating UE that is e.g. leaving the group in order to stop the measurement reports. The measurement command may in this case comprise an empty cell list, meaning that the UE shall stop measuring the neighbor cells.

Target Cell Preparation for a Group

Figure 6B:
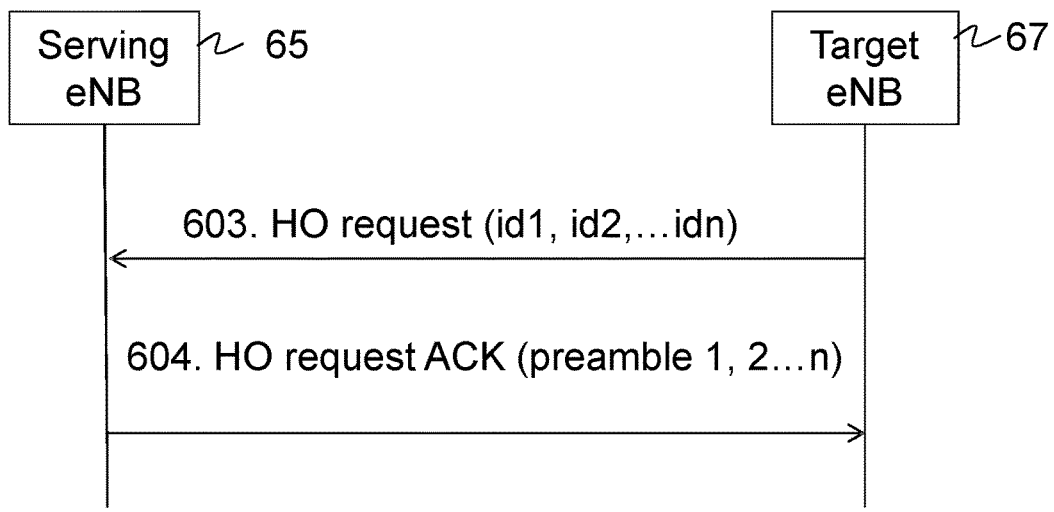

When the serving eNodeB 65 gets the measurement report 602 from the coordinating UE 60, the eNodeB 65 makes a joint HO decision based on the measurement report and selects a same target cell for all the UEs of the group. As illustrated in FIG. 6b, the serving eNodeB 65 sends a HO request 603 to the target eNodeB 67 serving the selected target cell in order to prepare for the HO. The HO request 603 comprises the identities of all UEs in the group, id1, id2, . . . idn. The target eNodeB 67 reserves dedicated preambles for all UEs. The reserved dedicated preambles are included in the HO request ACK message 604 in reply to the HO request 603. Thereafter, the serving eNodeB 65 may send an ordinary HO command comprising the corresponding dedicated preamble to each UE in the group, such that the UEs in the group may perform HO upon reception of the HO command even though they have not sent any previous measurement report.

Figure 7A:
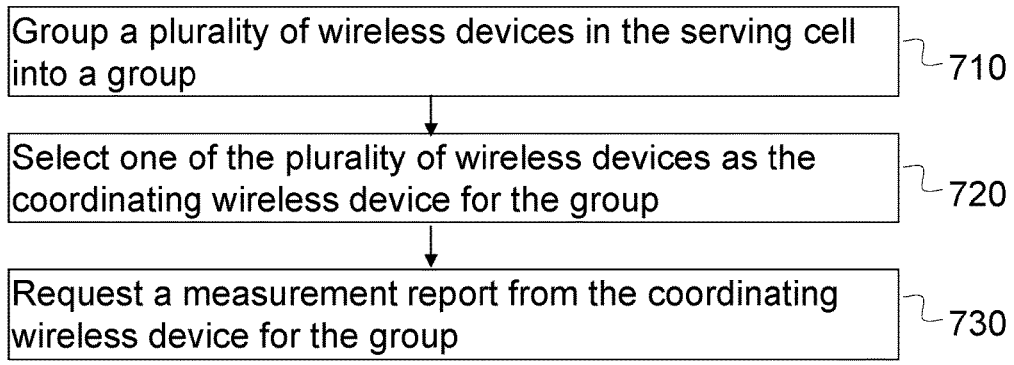
FIGS. 7a-c are flowcharts illustrating the method in the first radio network node according to embodiments of the invention.

FIG. 7a is a flowchart illustrating a method for supporting HO. The method is performed in a first radio network node of a wireless network. The first radio network node serves wireless devices of a serving cell. The radio network node may e.g. be an eNodeB in LTE. The method comprises:

710: Grouping a plurality of wireless devices in the serving cell into a group. The wireless devices may e.g. be UEs in the serving cell.

720: Selecting one of the plurality of wireless devices as the coordinating wireless device for the group.

730: Requesting a measurement report from the coordinating wireless device. The purpose of the measurement report is to support a joint HO decision for the plurality of wireless devices of the group.

In this way, the measurement reports are requested from a minimum of wireless devices as it is requested only from the coordinating wireless device of the group, thus reducing the signaling overhead for the HO procedure.

Figure 7B:
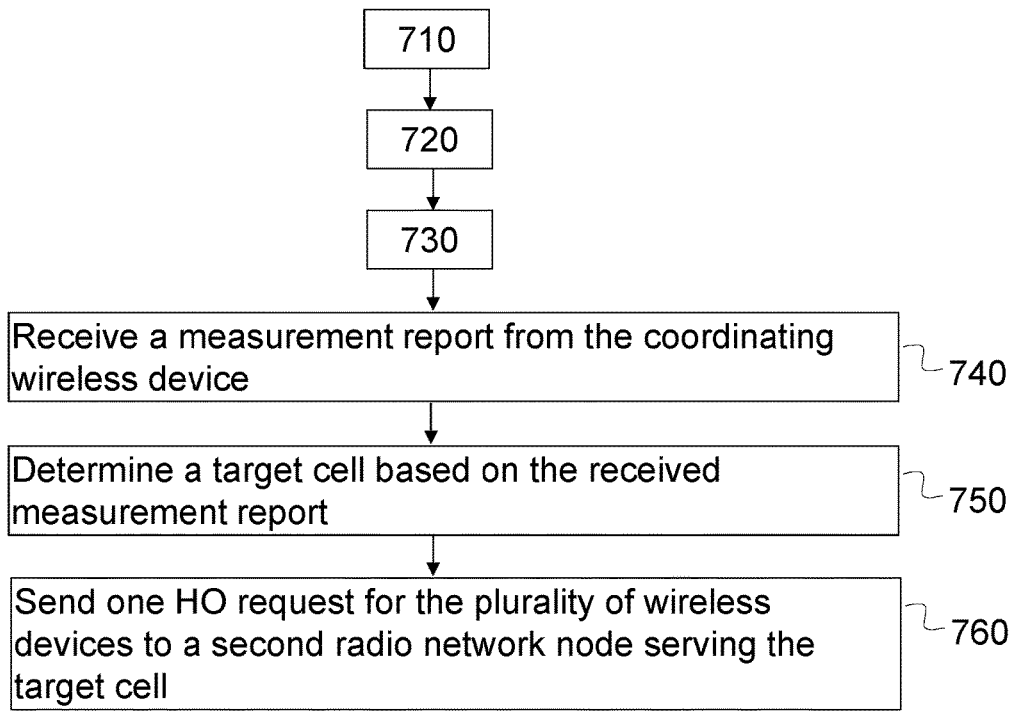

FIG. 7b is a flowchart illustrating the method according to another embodiment of the invention. In addition to the grouping of the plurality of wireless devices, 710, the selection of the coordinating wireless device, 720, and the requesting of a measurement report, 730, the method comprises:

740: Receiving a measurement report from the coordinating wireless device.

750: Determining a target cell based on the received measurement report.

760: Sending one HO request for the plurality of wireless devices to a second radio network node serving the target cell, such as a target eNodeB. The HO request comprises identities of the plurality of wireless devices.

The signaling overhead for the HO procedure is thus even further reduced in this embodiment by sending only one HO request for all UEs of the first group.

Figure 7C:
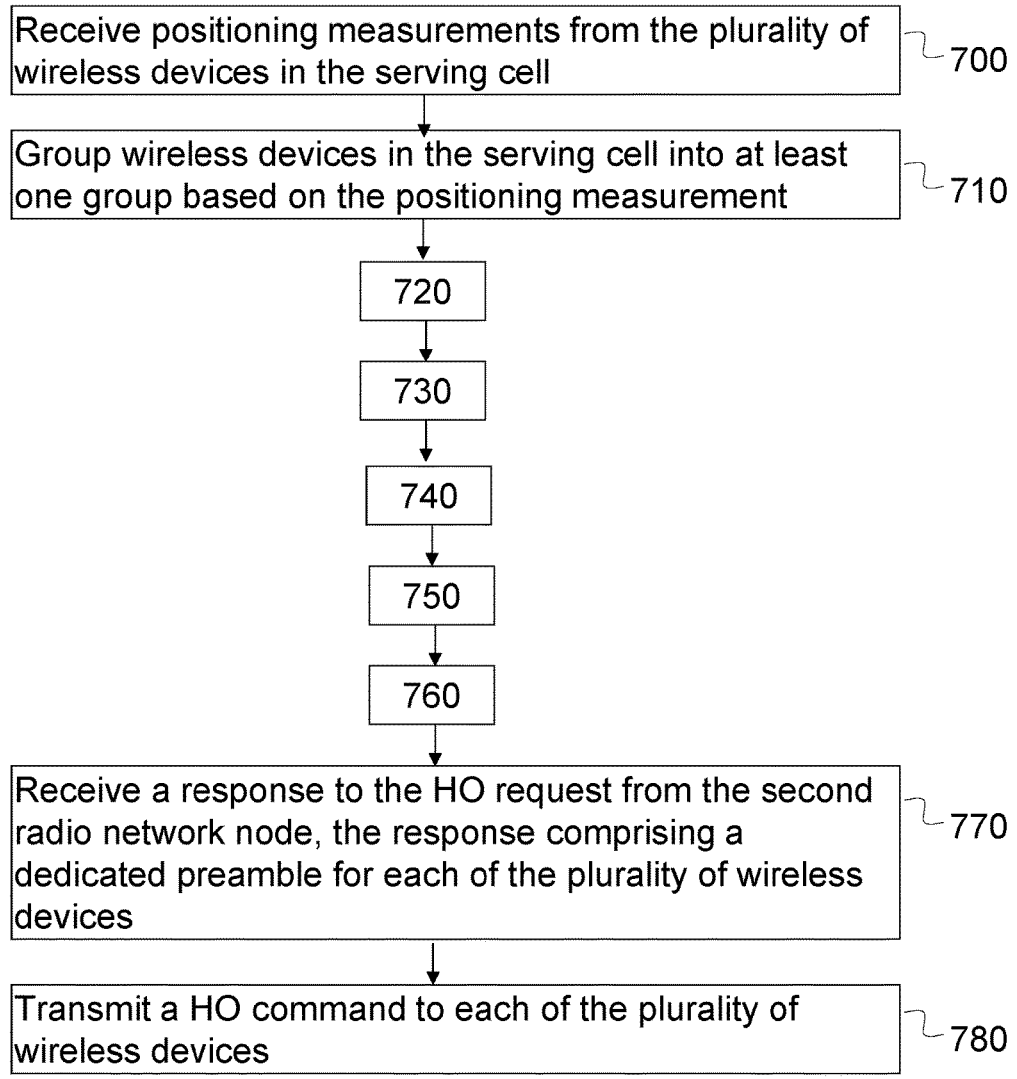

FIG. 7c is a flowchart illustrating the method according to still another embodiment of the invention. The method comprises the following in addition to the procedure described with reference to FIGS. 7b:

700: Receiving positioning measurements from the plurality of wireless devices in the serving cell. In embodiments, radio channel quality measurements may be received instead of, or in addition to, the positioning measurements. The positioning measurements may comprise the actual UE position or they may comprise measurements that the radio network node may use to calculate the UE positioning. The grouping 710 of the plurality of wireless devices in the serving cell may be based on the positioning measurements and/or the radio channel quality measurements. In an alternative embodiment, a network based positioning method may be used to determine positions of wireless devices and the positioning measurements may therefore be received from a network node instead of from the wireless devices. Furthermore, selecting 720 one of the plurality of wireless devices as the coordinating wireless device for the group may optionally comprise determining a radio channel quality level for each of the plurality of wireless devices based on the received radio channel quality measurement, and selecting the wireless device having the highest determined radio channel quality level as the coordinating wireless device. The wireless device with the highest channel quality may be best suited to be the coordinating wireless device, as already mentioned above.

As illustrated, the method may optionally also comprise the following:

770: Receiving a response to the HO request from the second radio network node, the response comprising a dedicated preamble for each of the plurality of wireless devices. The signaling overhead is thus reduced as only one HO request response is received for all UEs of a group.

780: Transmitting a HO command to each of the plurality of wireless devices, the HO command comprising the dedicated preamble for the respective wireless device.

In the embodiment described with reference to FIG. 7c, the grouping 710 of the plurality of wireless devices may, in accordance with the grouping method B described above, further comprise:

Determining a radio channel quality level for each of the plurality of wireless devices based on the received radio channel quality measurements.

Grouping the plurality of wireless devices into the group based on the determined radio channel quality levels, and maximum and minimum radio channel quality levels defined for the group. In the above described example, UEs that have a radio channel quality level within the range Thm±$\chi$ belong to a same group. In this example, the maximum and minimum radio channel quality levels are determined by $\chi$ which is an offset defined based on system dimensioning and the quality level Thm.

In the embodiment described with reference to FIG. 7c, the grouping 710 of the plurality of wireless devices may, in accordance with the grouping method A described above, further comprise:

Determining a distance to the first radio network node for each of the plurality of wireless devices based on the received positioning measurements.

Grouping the plurality of wireless devices into the group based on the determined distances to the first radio network node, and maximum and minimum distances defined for the group. In the above described example, UEs that are at a distance from the eNodeB that is within the range Dn±$\alpha$ belong to a same group.

In the embodiment described with reference to FIG. 7c, the coordinating wireless device may be selected 720 based on the positioning measurements. However, other alternatives to select the coordinating wireless device are also possible. The grouping 710 of the plurality of wireless devices may comprise requesting the coordinating wireless device to form the group using D2D functionality, in accordance with the grouping method D described above.

In accordance with the grouping method C described above, the grouping 710 of the plurality of wireless devices may be performed based also on a speed and/or a direction of movement of the plurality of wireless devices.

Figure 8:
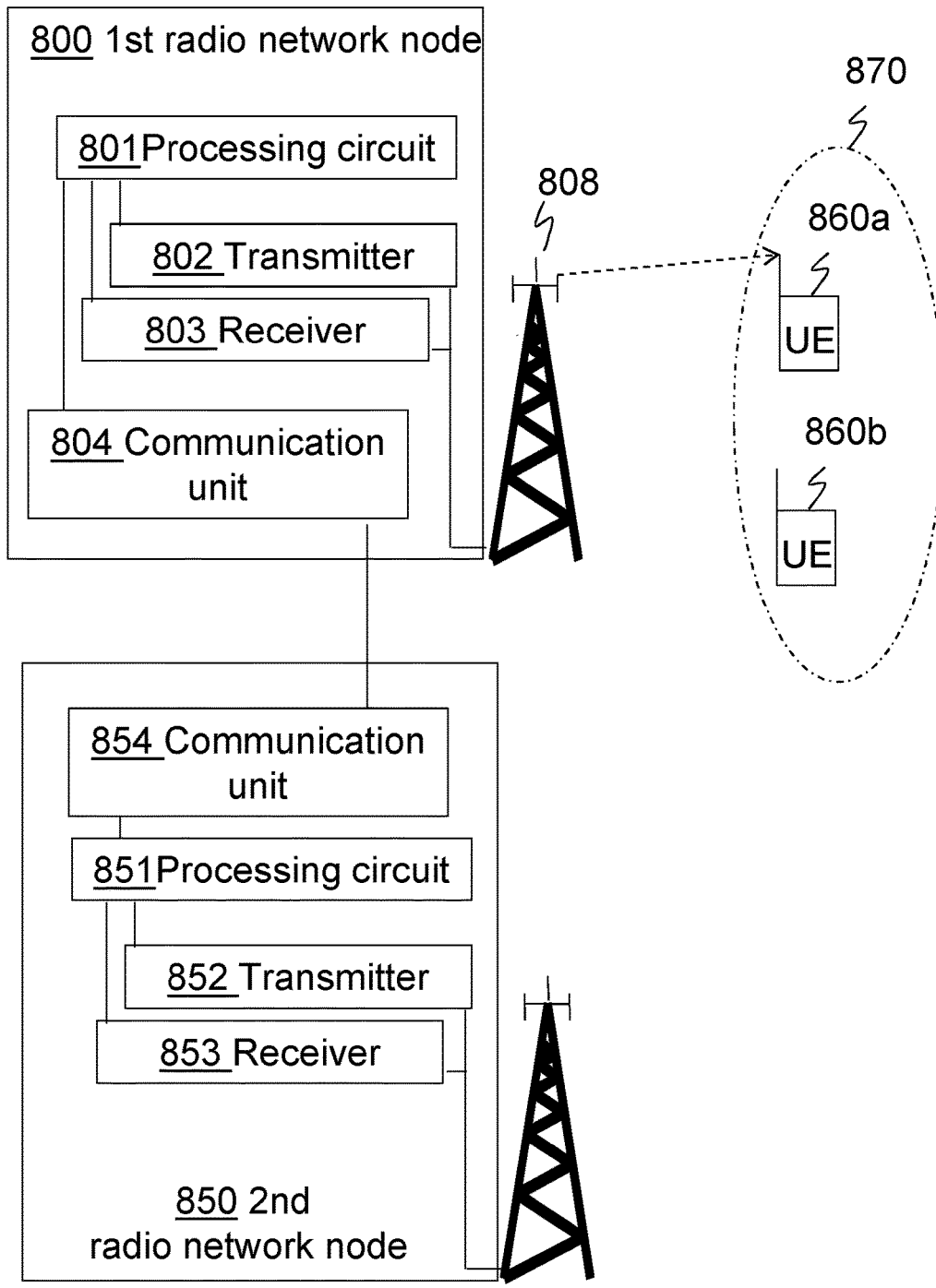
FIG. 8 is a block diagram schematically illustrating a first and a second radio network node according to embodiments of the invention.

A first radio network node 800 of a wireless network is schematically illustrated in the block diagram in FIG. 8. The first radio network node 800, which may e.g. be an eNodeB, is configured to serve wireless devices of a serving cell and to support HO of the wireless devices. The first radio network node comprises a processing circuit 801 configured to group a plurality of wireless devices 860*a*-*b* in the serving cell into a group 870. The processing circuit 801 is also configured to select one of the plurality of wireless devices as the coordinating wireless device for the group. The processing circuit 801 is also configured to request a measurement report from the coordinating wireless device. The measurement report is to support a joint HO decision for the plurality of wireless devices of the group.

In one embodiment of the invention, the first radio network node 800 further comprises a receiver 803 and a communication unit 804. The receiver 803 is configured to receive a measurement report from the coordinating wireless device. The receiver 803 may be connected to a receiving antenna 808 via one or more antenna ports. The processing circuit 801 is further configured to determine a target cell based on the received measurement report. The communication unit 804 is configured to send one HO request for the plurality of wireless devices to a second radio network node 850 serving the target cell. The second radio network node 850 is also illustrated in the block diagram in FIG. 8. The HO request comprises identities of the plurality of wireless devices. The second radio network node 850 also comprises a processing circuit 851, a transmitter 852, a receiver 853, and a communicating unit 854 for communicating with the first radio network node 800, in analogy with the above described first radio network node.

In another embodiment, the first radio network node 800 also comprises a transmitter 802. The communication unit 804 is further configured to receive a response to the HO request from the second radio network node 850. The response comprises a dedicated preamble for each of the plurality of wireless devices. The transmitter 802 is configured to transmit a HO command to each of the plurality of wireless devices 860*a*-*b*, the HO command comprising the dedicated preamble for the respective wireless device.

In embodiments of the invention, the receiver 803 is further configured to receive at least one of positioning measurements and radio channel quality measurements from the plurality of wireless devices in the serving cell. The processing circuit 801 is configured to group the plurality of wireless devices in the serving cell based on the at least one of the positioning measurements and the radio channel quality measurements.

The processing circuit 801 may also be configured to select one of the plurality of wireless devices as the coordinating wireless device for the group by determining a radio channel quality level for each of the plurality of wireless devices based on the received radio channel quality measurements, and selecting the wireless device having the highest determined radio channel quality level as the coordinating wireless device.

The processing circuit 801 may, in accordance with the grouping method B described above, be configured to group the plurality of wireless devices by determining a radio channel quality level for each of the plurality of wireless devices based on the received radio channel quality measurements, and grouping the plurality of wireless devices based on the determined radio channel quality levels and maximum and minimum radio channel quality levels defined for the group.

The processing circuit 801 may, in accordance with the grouping method A described above, be configured to group the plurality of wireless devices by determining a distance to the first radio network node for each of the plurality of wireless devices based on the received positioning measurements, and grouping the plurality of wireless devices into the group based on the determined distances to the first radio network node and maximum and minimum distances defined for the group.

In accordance with grouping method D described above, the processing circuit 801 may be configured to select one of the plurality of wireless devices as the coordinating wireless device based on the positioning measurements, and to group the plurality of wireless devices by requesting the coordinating wireless device to form the group using D2D functionality. In accordance with grouping method C described above, the processing circuit 801 may be configured to group the plurality of wireless devices based also on a speed and/or a direction of movement of the plurality of wireless devices.

In an alternative way to describe the embodiments in FIG. 8, the first radio network node 800 comprises a Central Processing Unit (CPU) which may be a single unit or a plurality of units. Furthermore, the first radio network node 800 comprises at least one computer program product (CPP) in the form of a non-volatile memory, e.g. an EEPROM (Electrically Erasable Programmable Read-Only Memory), a flash memory or a disk drive. The CPP comprises a computer program, which in turn comprises code means which when run on the first radio network node 800 causes the CPU to perform steps of the procedure described earlier in conjunction with FIGS. 7*a-c*. In other words, when said code means are run on the CPU, they correspond to the processing circuit 801 in the radio network node 800 of FIG. 8.

The above mentioned and described embodiments are only given as examples and should not be limiting. Other solutions, uses, objectives, and functions within the scope of the accompanying patent claims may be possible.

The invention claimed is:

1. A method for supporting handover in a first radio network node of a wireless network, wherein the first radio network node serves wireless devices of a serving cell, the method comprising:
    grouping a plurality of wireless devices in the serving cell into a group, wherein the grouping is based on information received at the first radio network node,
    selecting one of the plurality of wireless devices as a coordinating wireless device for the group,
    requesting a measurement report only from the coordinating wireless device of the group, wherein the measurement report is used for determining a target cell for a joint handover for the plurality of wireless devices of the group,
    receiving the measurement report from the coordinating wireless device,
    determining the target cell based on the received measurement report, and
    sending a handover request for the plurality of wireless devices to a second radio network node serving the target cell, the handover request comprising identities of the plurality of wireless devices,
    wherein the coordinating wireless device and remaining other ones of the group of wireless devices are User Equipments.

2. The method according to claim 1, further comprising: receiving a response to the handover request from the second radio network node, the
    response comprising a dedicated preamble for each of the plurality of wireless devices, and transmitting a handover command to each of the plurality of wireless devices, the
    handover command comprising the dedicated preamble for the respective wireless devices.

3. The method according to claim 1, further comprising:
    receiving at least one of positioning measurements and radio channel quality measurements from the plurality of wireless devices in the serving cell,
    wherein the grouping of the plurality of wireless devices in the serving cell is based on the at least one of the positioning measurements and the radio channel quality measurements.

4. The method according to claim 3, wherein selecting one of the plurality of wireless devices as the coordinating wireless device for the group comprises: determining a radio channel quality level for each of the plurality of wireless devices based on the received radio channel quality measurements, and
    selecting a wireless device having the highest determined radio channel quality level as the coordinating wireless device.

5. The method according to claim 3, wherein grouping the plurality of wireless devices further comprises:
    determining a radio channel quality level for each of the plurality of wireless devices based on the received radio channel quality measurements, and
    grouping the plurality of wireless devices into the group based on the determined radio channel quality levels, and maximum and minimum radio channel quality levels defined for the group.

6. The method according to claim 3, wherein grouping the plurality of wireless devices further comprises:
    determining a distance to the first radio network node for each of the plurality of wireless devices based on the received positioning measurements,
    grouping the plurality of wireless devices into the group based on the determined distances to the first radio network node, and maximum and minimum distances defined for the group.

7. The method according to claim 3, wherein the coordinating wireless device is selected based on the positioning measurements, and wherein the grouping of the plurality of wireless devices comprises requesting the coordinating wireless device to form the group using device to device functionality.

8. The method according to claim 1, wherein the grouping of the plurality of wireless devices is performed based also on a speed and/or a direction of movement of the plurality of wireless devices.

9. The method of claim 1, wherein the measurement report includes a measurement list with radio channel quality measurements for a number of neighboring cells which are potential target cells.

10. A first radio network node of a wireless network configured to serve wireless devices of a serving cell and to support handover of the wireless devices, the first radio network node comprising:
- a processing circuit configured to group a plurality of wireless devices in the serving cell into a group, wherein the grouping is based on information received at the first radio network node, wherein the processing circuit is further configured to select one of the plurality of wireless devices as a coordinating wireless device for the group, wherein the processing circuit is further configured to request a measurement report from only the coordinating wireless device of the group, and wherein the measurement report is used for determining a target cell for a joint handover for the plurality of wireless devices of the group;
- a memory operatively coupled to the processing circuit and configured to store information that is used by the processing circuit, and
- a receiver and a communication unit, wherein the receiver is configured to receive the measurement report from the coordinating wireless device, wherein the processing circuit is further configured to determine a target cell based on the received measurement report, wherein the communication unit is configured to send a handover request for the plurality of wireless devices to a second radio network node serving the target cell, the handover request comprising identities of the plurality of wireless devices, and
- wherein the coordinating wireless device and remaining other ones of the group of wireless devices are User Equipments.

11. The first radio network node according to claim 10, further comprising a transmitter, wherein the communication unit is further configured to receive a response to the handover request from the second radio network node, the response comprising a dedicated preamble for each of the plurality of wireless devices, and wherein the transmitter is configured to transmit a handover command to each of the plurality of wireless devices, the handover command comprising the dedicated preamble for the respective wireless devices.

12. The first radio network node according to claim 10, wherein the receiver is further configured to receive at least one of positioning measurements and radio channel quality measurements from the plurality of wireless devices in the serving cell, and wherein the processing circuit is configured to group the plurality of wireless devices in the serving cell based on the at least one of the positioning measurements and the radio channel quality measurements.

13. The first radio network node according to claim 12, wherein the processing circuit is configured to select one of the plurality of wireless devices as the coordinating wireless device for the group by:
- determining a radio channel quality level for each of the plurality of wireless device based on the received radio channel quality measurements, and
- selecting a wireless device having the highest determined radio channel quality level as the coordinating wireless device.

14. The first radio network node according to claim 12, wherein the processing circuit is configured to group the plurality of wireless devices by:
- determining a radio channel quality level for each of the plurality of wireless devices based on the received radio channel quality measurements, and
- grouping the plurality of wireless devices into the group based on the determined radio channel quality levels, and maximum and minimum radio channel quality levels defined for the group.

15. The first radio network node according to claim 12, wherein the processing circuit is configured to group the plurality of wireless devices by:
- determining a distance to the first radio network node for each of the plurality of wireless devices based on the received positioning measurements, and
- grouping the plurality of wireless devices into the group based on the determined distances to the first radio network node, and maximum and minimum distances defined for the group.

16. The first radio network node according to claim 12, wherein the processing circuit is configured to select one of the plurality of wireless devices as the coordinating wireless device based on the positioning measurements, and to group the plurality of wireless devices by requesting the coordinating wireless device to form the group using device to device functionality.

17. The first radio network node according to claim 10, wherein the processing circuit is configured to group the plurality of wireless devices based also on a speed and/or a direction of movement of the plurality of wireless devices.

18. The first radio network node of claim 10, wherein the measurement report includes a measurement list with radio channel quality measurements for a number of neighboring cells which are potential target cells.

* * * * *